(12) United States Patent
Seaton et al.

(10) Patent No.: US 9,939,301 B2
(45) Date of Patent: Apr. 10, 2018

(54) MACHINE SYSTEM HAVING FUEL CONSUMPTION MONITORING

(71) Applicant: Electro-Motive Diesel, Inc., LaGrange, IL (US)

(72) Inventors: James David Seaton, Westmont, IL (US); Alexander Shubs, Jr., Chicago, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 123 days.

(21) Appl. No.: 15/044,292

(22) Filed: Feb. 16, 2016

(65) Prior Publication Data

US 2017/0234711 A1 Aug. 17, 2017

(51) Int. Cl.
*G01F 9/00* (2006.01)
*F02D 41/40* (2006.01)

(52) U.S. Cl.
CPC ............ *G01F 9/00* (2013.01); *F02D 41/40* (2013.01); *F02D 2200/101* (2013.01)

(58) Field of Classification Search
CPC ..... F02D 2200/0611; F02D 2200/0612; F02D 2200/0625; F02D 41/40; F02D 2200/101; G01F 9/00
USPC ...................................................... 73/114.52
See application file for complete search history.

(56) References Cited

U.S. PATENT DOCUMENTS

| | | |
|---|---|---|
| 3,546,441 A | 12/1970 | Brendle |
| 5,961,567 A | 10/1999 | Azzaro et al. |
| 6,325,050 B1 | 12/2001 | Gallagher et al. |
| 6,564,172 B1 * | 5/2003 | Till .......................... G01F 9/008 123/204 |
| 6,601,442 B1 | 8/2003 | Decker et al. |
| 7,467,619 B2 | 12/2008 | Sheikh et al. |
| 8,095,253 B2 | 1/2012 | Kane et al. |
| 8,589,002 B1 | 11/2013 | Henry et al. |
| 2008/0097682 A1* | 4/2008 | Peron ................... F02D 41/0085 701/103 |
| 2011/0307190 A1 | 12/2011 | Higgins et al. |
| 2014/0033946 A1* | 2/2014 | Billig ......................... F17C 7/00 105/35 |

FOREIGN PATENT DOCUMENTS

| | | |
|---|---|---|
| JP | 2015145651 | 8/2015 |
| WO | 2010024575 | 3/2010 |

OTHER PUBLICATIONS

English Machine translation for KR20100024152.*

* cited by examiner

*Primary Examiner* — Peter Macchiarolo
*Assistant Examiner* — Anthony W Megna Fuentes
(74) *Attorney, Agent, or Firm* — Finnegan, Henderson, Farabow, Garrett & Dunner, LLP

(57) ABSTRACT

A system is disclosed for use with a machine having an engine with at least one cylinder. The system may have at least one injector configured to inject fuel into the at least one cylinder, and a controller in communication with the at least one injector. The controller may be configured to determine an injection duration of the at least one injector. The controller may also be configured to calculate a fuel consumption value for the machine based on the injection duration.

18 Claims, 3 Drawing Sheets

| THROTTLE NOTCH SETTING | LINE-HAUL DUTY CYCLE % | SWITCHER DUTY CYCLE % | INJECTION CURRENT DURATION | LINE-HAUL FUEL CONSUMPTION | SWITCHER FUEL CONSUMPTION |
|---|---|---|---|---|---|
| LOW IDLE | 19.0 | 29.9 | 1.7 | 0.32 | 0.51 |
| IDLE | 19.0 | 29.9 | 1.6 | 0.30 | 0.48 |
| DYN. BRK | 12.5 | 0.0 | 1.2 | 0.15 | 0.00 |
| 1 | 6.5 | 12.4 | 3.6 | 0.23 | 0.45 |
| 2 | 6.5 | 12.3 | 6.1 | 0.40 | 0.75 |
| 3 | 5.2 | 5.8 | 8.9 | 0.46 | 0.52 |
| 4 | 4.4 | 3.6 | 9.5 | 0.42 | 0.34 |
| 5 | 3.8 | 3.6 | 11.5 | 0.44 | 0.41 |
| 6 | 3.9 | 1.5 | 17.1 | 0.67 | 0.26 |
| 7 | 3.0 | 0.2 | 18.2 | 0.55 | 0.04 |
| 8 | 16.2 | 0.8 | 20.9 | 3.39 | 0.17 |
| | | | TOTAL FUEL CONSUMPTION | 7.33 | 3.93 |

| THROTTLE NOTCH SETTING | LINE-HAUL DUTY CYCLE % | SWITCHER DUTY CYCLE % | BRAKE HORSEPOWER | LINE-HAUL BRAKE HORSEPOWER | SWITCHER BRAKE HORSEPOWER |
|---|---|---|---|---|---|
| LOW IDLE | 19.0 | 29.9 | 15 | 2.85 | 4.49 |
| IDLE | 19.0 | 29.9 | 21 | 3.99 | 6.28 |
| DYN. BRK | 12.5 | 0.0 | 29 | 3.63 | 0.00 |
| 1 | 6.5 | 12.4 | 266 | 17.29 | 32.98 |
| 2 | 6.5 | 12.3 | 625 | 40.53 | 76.88 |
| 3 | 5.2 | 5.8 | 1160 | 60.32 | 67.28 |
| 4 | 4.4 | 3.6 | 1571 | 69.12 | 56.56 |
| 5 | 3.8 | 3.6 | 2084 | 79.19 | 75.02 |
| 6 | 3.9 | 1.5 | 3049 | 118.91 | 45.74 |
| 7 | 3.0 | 0.2 | 3753 | 112.59 | 7.51 |
| 8 | 16.2 | 0.8 | 4504 | 729.65 | 36.03 |
| | | | TOTAL BRAKE HORSE POWER | 1238.17 | 408.77 |

| BRAKE HORSEPOWER SPECIFIC FUEL CONSUMPTION RATE | | |
|---|---|---|
| LINE HAUL DUTY CYCLE | 0.00592 | |
| SWITCHER DUTY CYCLE | 0.00961 | |

FIG. 3

MACHINE SYSTEM HAVING FUEL CONSUMPTION MONITORING

TECHNICAL FIELD

The present disclosure relates generally to a machine system and, more particularly, to a machine system having fuel consumption monitoring.

BACKGROUND

An engine combusts a mixture of fuel and air to generate a mechanical power output. The amount of fuel consumed by the engine for a given power output can depend on a number of factors including, among other things, a health of the engine and handling characteristics of the engine's operator. In some instances, it may be helpful to know how much fuel is being consumed by the engine for a given set of conditions. For example, a significant change in fuel consumption under relatively constant conditions could indicate malfunction or mishandling of the engine, and knowledge of the change could allow for preventative measures to be implemented that avoid failure and/or reduce operating costs.

Historically, the fuel consumption of an engine was determined by monitoring a reduction of fuel within a connected tank over a period of time. This method, however, required a significant amount of time to elapse, and resulted in low precision. Other methods have included the use of expensive and delicate flow meters.

One attempt to improve fuel consumption monitoring is disclosed in U.S. Pat. No. 6,564,172 of Till that issued on May 12, 2003 ("the '172 patent"). Specifically, the '172 patent discloses a system for determining an ideal fuel usage value of a locomotive. The system includes a microprocessor configured to track an amount of time spent in each of eight different throttle notch settings. The microprocessor is also configured to determine ideal fuel usage factors associated with each setting based on a monitored generator load and engine speed. Individual fuel usage values are calculated for each throttle notch setting, and then summed to represent a total ideal fuel usage quantity. The total ideal fuel usage quantity for a particular run traveled by the locomotive has been shown to be within a few percent of actual usage.

Although the system of the '172 patent may be accurate to within a few percent, this accuracy may not be high enough for some applications. In addition, it may be difficult to compare the total ideal fuel usage quantity determined by the system of the '172 patent for a particular locomotive completing a particular run, with a total ideal fuel usage quantity determined for a different locomotive completing a different run under different conditions. Accordingly, the benefit of determining the total ideal fuel usage quantity may be low.

The machine system of the present disclosure solves one or more of the problems set forth above and/or other problems in the art.

SUMMARY

In one aspect, the present disclosure is directed to a system for a machine having an engine with at least one cylinder. The system may include at least one injector configured to inject fuel into the at least one cylinder, and a controller in communication with the at least one injector. The controller may be configured to determine an injection duration of the at least one injector. The controller may also be configured to calculate a fuel consumption value for the machine based on the injection duration.

In another aspect, the present disclosure is directed to another system for a machine having an engine with at least one cylinder, and a generator driven by the engine. The system may include an injector configured to inject fuel into the at least one cylinder, a sensor configured to generate a first signal indicative of a performance of the machine, an input device manually movable to generate a second signal indicative of at least one of a desired engine speed and a desired generator load, and a controller in communication with the at least one injector, the sensor, and the input device. The controller may be configured to generate a current waveform for the injector based on the second signal, to selectively adjust the current waveform based on the first signal, and to determine an injector duration based on a pulse width of the current waveform. The controller may also be configured to calculate a fuel consumption value for the machine based on the injection duration.

In yet another aspect, the present disclosure is directed to a method of monitoring fuel consumption for a machine having an engine with at least one cylinder, and a generator driven by the engine. The method may include injecting fuel into the at least one cylinder, and generating a first signal indicative of a performance of the machine. The method may also include receiving input indicative of at least one of a plurality of settings. Each of the plurality of settings may correspond to a different desired engine speed and a different desired generator load. The method may further include generating an injector current waveform based on the input, and selectively adjusting the injector current waveform based on the first signal. The method may additionally include determining an injector duration based on a pulse width of the injector current waveform, and calculating a fuel consumption value for the machine based on the injection duration.

BRIEF DESCRIPTION OF THE DRAWING

FIG. 3 is an exemplary disclosed control chart that may be referenced by the machine system of FIG. 1 during operation.

DETAILED DESCRIPTION

Figure 1:
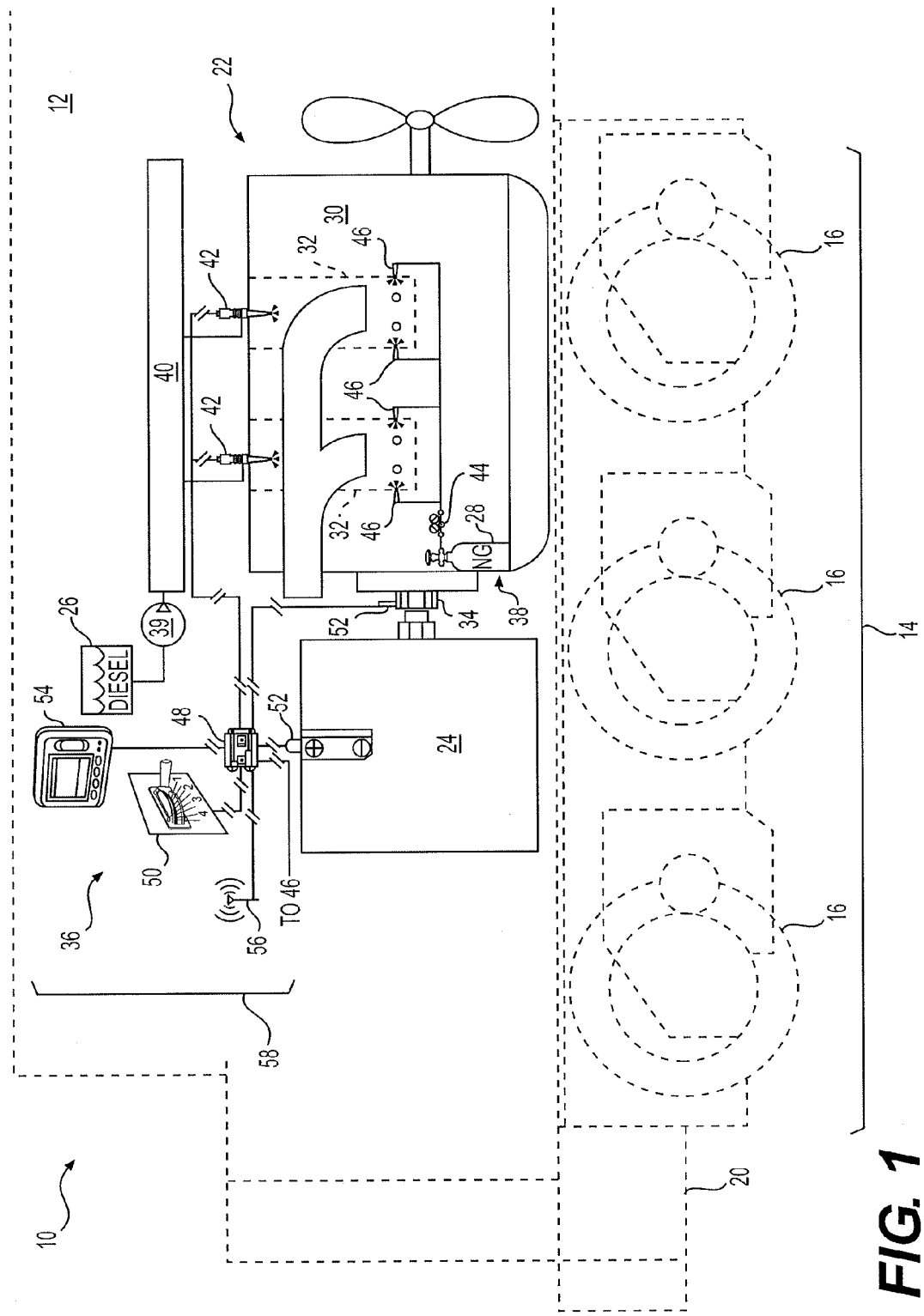
FIG. 1 is a diagrammatic illustration of an exemplary disclosed machine system.

FIG. 1 illustrates an exemplary machine 10. Machine 10 may be a mobile machine that performs some type of operation associated with an industry such as transportation, farming, mining, construction, or any other industry known in the art. For example, machine 10 may be a locomotive of a train consist. As a locomotive, machine 10 may include, among other things, a car body 12 that is supported at opposing ends by a plurality of trucks 14. Each truck 14 may be configured to engage a track (not shown) via a plurality of wheels 16, and to support a frame 20 of car body 12. Any number of engines 22 may be mounted to frame 20, housed within car body 12, and configured to drive a generator 24 that produces electricity to drive wheels 16.

Engine 22 may be a single- or dual-fuel engine configured to combust any type of fuel and generate a mechanical output that drives generator 24. For example, engine 22 may be configured to combust a liquid fuel (e.g., diesel fuel) and/or a gaseous fuel (e.g., natural gas). The liquid fuel may be supplied to engine 22 from a first tank 26, while the gaseous fuel may be supplied to engine 22 from a second tank 28. In some embodiments, tank 28 may be mounted on a separate tender car (not shown) that is coupled to and towed by the locomotive. Engine 22 may operate in a liquid-fuel only mode, in a dual-fuel mode, and/or in a gaseous-fuel only mode, as desired.

Engine 22 may include an engine block 30 that at least partially defines a plurality of cylinders 32. A piston (not shown) may be slidably disposed within each cylinder 32 to reciprocate between a top-dead-center position and a bottom-dead-center position, and a cylinder head (not shown) may be associated with each cylinder 32. Each cylinder 32, piston, and cylinder head may together at least partially define a combustion chamber. In the illustrated embodiment, engine 22 includes two combustion chambers for illustrative purposes only. It is contemplated that engine 22 may include a greater or lesser number of combustion chambers that are arranged in an inline configuration, in an opposing-piston configuration, in a V-configuration, or in another configuration, as desired. Combustion occurring within cylinders 32 may create a mechanical work output that drives the pistons to rotate a crankshaft 34 connected to generator 24.

Engine 22 may be equipped with a liquid fuel circuit 36 and/or a gaseous fuel circuit 38 that separately deliver liquid and gaseous fuels into cylinders 32. Liquid fuel circuit 36 may include, among other things, a pump 39, a common rail 40, and at least one fuel injector 42 associated with each cylinder 32. Pump 39 may draw liquid fuel from tank 26, pressurize the liquid fuel, and direct the pressurized liquid fuel into common rail 40 for distribution to the different fuel injectors 42. Gaseous fuel circuit 38 may similarly include a regulator 44, and at least one fuel injector 46 associated with each cylinder 32. Pressurized gaseous fuel contained within tank 28 may be selectively metered by regulator 44 through each of injectors 46 and into cylinders 32. In some embodiments, a common injector (not shown) may be used to inject both the liquid and gaseous fuels. In the disclosed embodiment, the liquid fuel is injected axially into each cylinder 32, while the gaseous fuel is separately injected radially (e.g., by way of one or more air inlet ports located within an annular wall of cylinder 32). It is contemplated, however, that both flows of fuel could alternatively be injected axially or both injected radially, as desired.

Injectors 42 and/or 46 may be electrically actuated injectors. In particular, injectors 42 and/or 46 may include windings (not shown) that, when energized (i.e., when a current waveform is passed through the windings), establish a magnetic field functioning to urge an armature (not shown) and associated valve element (not shown) from a first or non-injecting position to a second or injecting position. When injectors 42 and/or 46 are de-energized, the armature and valve element return to the non-injecting position.

Figure 2:
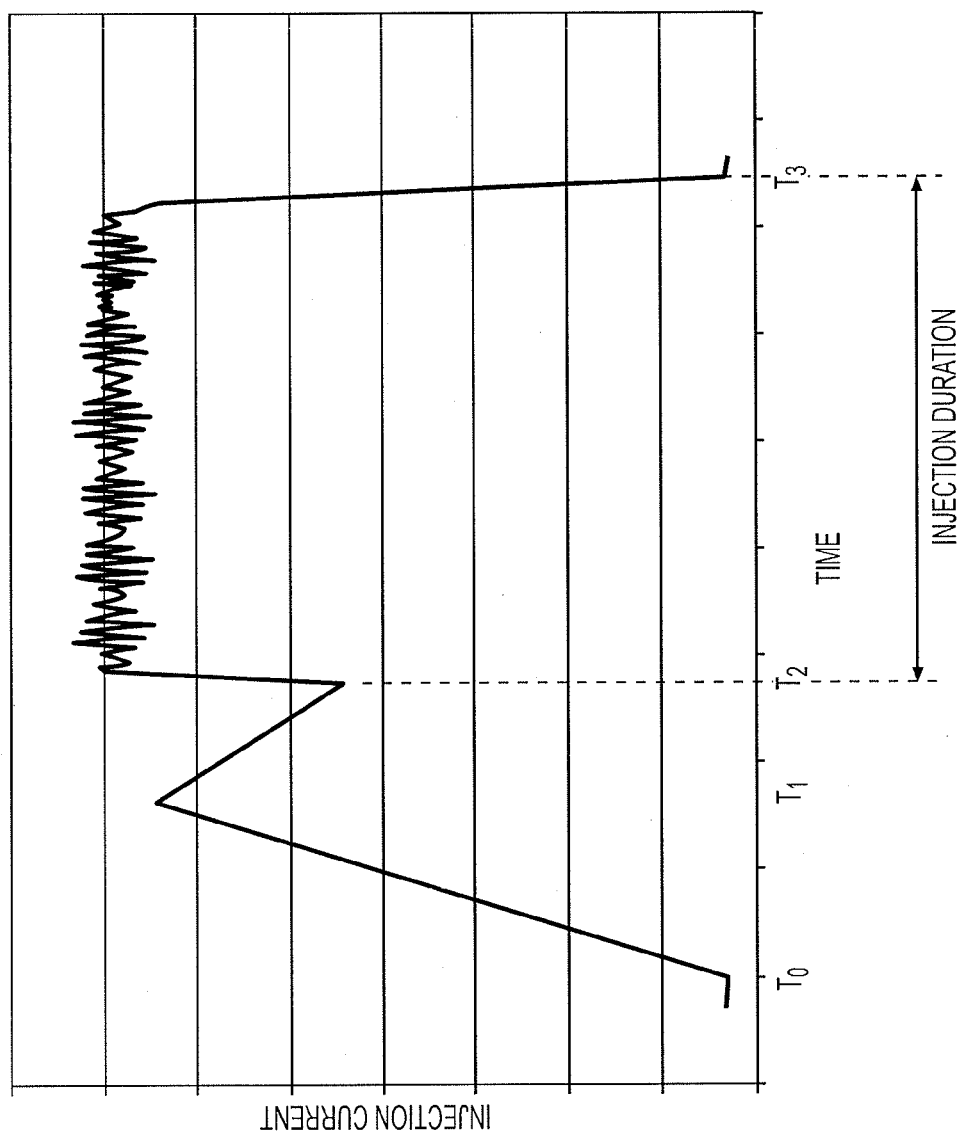
FIG. 2 is a graph depicting an exemplary disclosed operation of the machine system of FIG. 1.

An exemplary current waveform is shown in FIG. 2. In this example, current directed to injectors 42 and/or 46 is increased at a time $T_0$, resulting in movement of the associated valve element toward the injecting position. As the valve element nears the injecting position at a time $T_1$, the current is reduced slightly to help cushion the movement and avoid bouncing of the valve element away from the injecting position. Thereafter, at a time $T_2$, the current is elevated to a higher hold-in current level to maintain the valve element in its fully open and injecting position. At a time $T_3$, the current is reduced back down to its starting level to allow the valve element to return to its non-injecting position. In the current waveform of FIG. 2, injectors 42 and/or 46 may inject fuel from time $T_2$ to time $T_3$, while the valve element is maintained in its fully open position. For the purposes of this disclosure, the time between $T_2$ and $T_3$ may be considered the pulse width of the current waveform, and represents a duration of fuel injection by the corresponding injectors 42 and/or 46.

The current waveform used to regulate operation of injectors 42 and/or 46 may be generated by a controller 48 in response to a desired machine setting and modified based on sensed machine operation. The desired machine setting may be received from an operator of machine 10 via an input device 50. In the example of FIG. 1, wherein machine 10 is a locomotive, input device 50 embodies a throttle that is movable between a plurality of notch settings (e.g., a low-idle setting, an idle setting, a dynamic braking setting, and up to eight consecutive power settings). Each of the notch settings may correspond with a desired speed of engine 22 and a desired load on generator 24. During operation of machine 10, controller 48 may monitor actual engine performance (e.g., via one or more sensors 52), and selectively modify, among other things, the current waveforms directed to injectors 42 and/or 46 when the actual values deviate from the desired values by at least threshold amounts.

Controller 48 may embody a single microprocessor or multiple microprocessors that include a means for controlling an operation of injectors 42 and/or 46. Numerous commercially available microprocessors can be configured to perform the functions of controller 48. It should be appreciated that controller 48 could readily embody a general machine or engine microprocessor capable of controlling numerous machine or engine functions. Controller 48 may include all the components required to run an application such as, for example, a memory, a secondary storage device, and a processor, such as a central processing unit or any other means known in the art for controlling injectors 42 and/or 46. Various other known circuits may be associated with controller 48, including power supply circuitry, signal-conditioning circuitry, solenoid driver circuitry, communication circuitry, switching circuitry, and other appropriate circuitry.

Sensors 52 could take many different forms. In a first embodiment, a first sensor 52 is associated with an electrical output of generator 24. That is, sensor 52 may be a load sensor configured to measure an electrical output of generator 24. This output may then be compared by controller 48 to the desired output and, when a significant difference exists, controller 48 may generate a current waveform calling for increased or decreased fuel supply. In a second embodiment, a second sensor 52 is associated with the mechanical output of engine 22. That is, sensor 52 could measure a speed of engine 22 (e.g., of crankshaft 34), and controller 48 may compare the speed to a desired speed. When a significant difference exists between actual and desired engine speeds, controller 48 may generate a current waveform calling for increased or decreased fuel supply. It is contemplated that both a load sensor and a speed sensor could be utilized, if desired.

As will be explained in more detail in the following section, controller 48 may be capable of calculating a fuel consumption of machine 10 (i.e., of engine 22) based on the current waveforms directed to injectors 42 and/or 46. Resulting fuel consumption values may then be displayed for an onboard operator of machine 10 and/or transmitted to other locations for further processing. For this purpose, controller 48 may be connected to a display 54 and a communication device 56. Controller 48, display 54, and communication device 56, along with injectors 42 and/or 46 and sensors 52 may be considered a machine system 58 that is capable of calculating, displaying, and communicating the fuel consumption values of machine 10.

Display 54 may include one or more monitors (e.g., a liquid crystal display (LCD), a cathode ray tube (CRT), a personal digital assistant (PDA), a plasma display, a touchscreen, a portable hand-held device, or any such display device known in the art) configured to actively and responsively show the fuel consumption values, related recommendations, warnings, speeds, loads, etc. to the operator of machine 10. Display 54 is typically disposed in close proximity to a cabin of machine 10 and within the view of the operator. However, in some applications, display 54 could be located offboard, if desired. Display 54 may be connected to controller 48, and controller 48 may execute instructions to render graphics and images on display 54.

Communication device 56 may facilitate communication between controller 48 and an offboard location (e.g., a back office), or between controller 48 and another onboard location (e.g., another controller of the same or another locomotive within the same consist). This communication may include, for example, the fuel consumption values, speeds, loads, and other related information. Data messages may be sent and received via a wired or a wireless communication link. The wireless communications may include satellite, cellular, infrared, and any other type of wireless communications that enable communication device 56 to exchange information between controller 58 and other entities.

FIG. 3 is an exemplary control chart utilized by controller 48 when determining the fuel consumption values referenced above. FIG. 3 will be discussed in more detail below to further illustrate the disclosed concepts.

INDUSTRIAL APPLICABILITY

The disclosed machine system may be used in any application where accurate information regarding fuel consumption is required. The disclosed machine system finds particular applicability in mobile applications, such as in locomotives, where the system may calculate the information using input from already existing hardware. Operation of machine system 58 will now be described in detail with reference to FIG. 3.

Machine 10 may operate in any number of modes of operation. In the disclosed example, machine 10, as a locomotive, operates in a Line-Haul mode of operation or in a Switcher mode of operation. Each of these modes of operation may correspond with different duty cycles, and a corresponding amount of time spent within each of the different available settings of input device 50 (i.e., within each of the notch settings of the throttle). For example, as shown in FIG. 3, when machine 10 is functioning as a locomotive in the Line-Haul mode of operation, machine 10 may operate for approximately 19% of its time in the low idle setting, approximately 19% of its time in the idle setting, approximately 12.5% of its time in the dynamic braking setting, approximately 6.5% of its time in the notch 1 setting, approximately 6.5% of its time in the notch 2 setting, approximately 5.2% of its time in the notch 3 setting, approximately 4.4% of its time in the notch 4 setting, approximately 3.8% of its time in the notch 5 setting, approximately 3.9% of its time in the notch 6 setting, approximately 3.0% of its time in the notch 7 setting, and approximately 16.2% of its time in the notch 8 setting. Similarly, as also shown in FIG. 3, when machine 10 is functioning as a locomotive in the Switcher mode of operation, machine 10 may operate for approximately 29.9% of its time in the low idle setting, approximately 29.9% of its time in the idle setting, approximately 0.0% of its time in the dynamic braking setting, approximately 12.4% of its time in the notch 1 setting, approximately 12.3% of its time in the notch 2 setting, approximately 5.8% of its time in the notch 3 setting, approximately 3.6% of its time in the notch 4 setting, approximately 3.6% of its time in the notch 5 setting, approximately 1.5% of its time in the notch 6 setting, approximately 0.2% of its time in the notch 7 setting, and approximately 0.8% of its time in the notch 8 setting.

During operation in any one mode of machine 10, the notch setting of input device 50 may correspond with a desired speed of engine 22 and a desired load on generator 24. As described above, sensors 52 may monitor actual engine speed and/or actual generator load, and generate corresponding signals directed to controller 58. In response to a comparison of the desired and actual values, controller 58 may generate and/or modify the current waveforms directed to injectors 42 and/or 46.

The pulse width of the current waveforms directed to (i.e., the injection duration of) injectors 42 and/or 46 may correspond with an amount of fuel injected by injectors 42 and/or 46 into cylinders 32. In particular, for a known or assumed pressure of fuel supplied to each of injectors 42 and/or 46, and for a known or assumed opening area of injectors 42 and/or 46 when the associated valve elements are in their fully open positions, controller 48 may be configured to calculate a corresponding flow rate of fuel through injectors 42 and/or 46 into cylinders 32. This flow rate may then be adjusted as a function of the injection duration (e.g., multiplied by the injection duration) to determine the corresponding quantity of injected fuel. However, if it is assumed that the fuel pressures are about the same for all engines 22, and that the valve elements of all injectors 42 and/or 46 are open to about the same flow area, pulse width or injection duration, alone, may be used as a unitless value to represent the quantity of injected fuel, if desired.

In order for this unitless quantity of injected fuel calculated by controller 48 to be more useful, the quantity should be normalized in some manner for comparison between machines, between operators, between routes, etc. In one example, the quantity of injected fuel can be normalized based on the duty cycle associated with the current mode of operation. For example, after determining a fuel injection quantity for each setting of input device 50, controller 48 may determine an overall fuel consumption value for machine 10 that corresponds with one of the Line-Haul and Switcher modes of operation. In the disclosed embodiment, controller 48 determines the overall fuel consumption value as a function of the duty cycles corresponding to the available modes of operation.

Exemplary fuel quantity and normalization calculations are provided in FIG. 3. As shown in FIG. 3, during operation in the Line-Haul or Switcher modes at the low idle setting, controller 48 has determined that the pulse width is about 1.7 seconds. This injection duration may then be multiplied by the corresponding percent of time that machine 10 usually spends at this setting for the given mode of operation. In the example of FIG. 3, controller 48 multiplied 1.7 seconds by 19% for the Line-Haul mode of operation and by 29.9% for the Switcher mode of operation in order to return unitless fuel quantities of 0.32 and 0.51, respectively. Controller 48 may do this for each setting, each time that machine 10 operates within each setting throughout a run. Each time that machine 10 passes through a particular setting of input device 50 (e.g., each time that the operator moves the throttle through the low idle setting), controller 48 may re-determine the corresponding pulse width and re-calculate the corresponding unitless fuel quantity. Fuel quantity values for each setting and/or for each mode of operation may then be shown on display 54 and/or communicated to another entity (e.g., to the back office).

In addition, controller 48 may determine, display and communicate a total fuel consumption value for each mode of operation. The total fuel consumption value may be determined as a sum-function of each of the individual setting values. For example, as shown in FIG. 3, controller 48 has determined a total fuel consumption value for operation in the Line-Haul mode to be 7.33 and for operation in the Switcher mode to be 3.93.

In some applications, it may also be useful to normalize the unitless fuel quantities determined at each notch setting based on an amount of brake horsepower produced at those notch settings. Controller 48 may determine the amount of brake horsepower being produced based on the signals produced by sensor(s) 52 (e.g., based on the generator load signals). In the example of FIG. 3, controller 48 has determined that machine 10 produces about 15 brake horsepower in the low idle setting, about 21 brake horsepower in the idle setting, about 29 brake horsepower in the dynamic braking setting, about 266 horsepower in the notch 1 setting, about 625 horsepower in the notch 2 setting, about 1160 horsepower in the notch 3 setting, about 1571 horsepower in the notch 4 setting, about 2084 horsepower in the notch 5 setting, about 3049 horsepower in the notch 6 setting, about 3753 horsepower in the notch 7 setting, and about 4504 horsepower in the notch 8 setting. Each of these brake horsepower values may then be modified as a function of the duty cycles for each mode of operation (e.g., multiplied by the duty cycles) to determine corresponding duty cycle brake horse power values. For example, for operation in the low-idle setting, controller 48 has determined the corresponding duty cycle brake horsepower values to be 2.85 and 4.49 for the Line-Haul and Switcher modes of operation, respectively.

Controller 48 may sum the duty cycle brake horsepower values to obtain total brake horse power values that can be used for normalization purposes. Controller 48 may then divide the total fuel consumption values for each mode of operation by the corresponding sum of the duty cycle brake horsepower values, in order to get brake horsepower specific fuel consumption rates. For the example of FIG. 3, controller 48 has divided the total fuel consumption values of 7.33 and 3.93 by the total brake horse power values of 1238.17 and 408.77 to obtain the brake horsepower specific fuel consumption values of 0.00592 and 0.009261, respectively.

Because the disclosed system may rely on monitored injection durations to determine fuel consumption values, the disclosed system may be highly accurate. In addition, because the disclosed system may provide multiple ways to display and normalize the fuel consumption values, comparisons between different engines, machines, operators, travel routes, etc., may be simplified.

It will be apparent to those skilled in the art that various modifications and variations can be made to the disclosed machine system without departing from the scope of the disclosure. Other embodiments of the machine system will be apparent to those skilled in the art from consideration of the specification and practice of the machine system disclosed herein. It is intended that the specification and examples be considered as exemplary only, with a true scope of the disclosure being indicated by the following claims and their equivalents.

What is claimed is:

1. A system for a machine having an engine with at least one cylinder and having the machine operable in a plurality of different modes, the system comprising:
   at least one injector configured to inject fuel into the at least one cylinder;
   an input device movable to indicate selection of one of a plurality of different settings; and
   a controller in communication with the at least one injector and configured to:
      determine an injection duration of the at least one injector;
      calculate a fuel consumption value for the machine based on the injection duration;
      calculate a fuel consumption value for each of the plurality of different settings;
      determine a duty cycle for each of the plurality of different modes; and
      modify the fuel consumption values for the plurality of different settings as a function of the duty cycle.

2. The system of claim 1, further including a sensor configured to generate a first signal indicative of a performance of the machine, wherein the controller is configured to generate a current waveform for the at least one injector based on the first signal.

3. The system of claim 2, wherein the controller is configured to determine the injector duration based on a pulse width of the current waveform.

4. The system of claim 2, wherein:
   the machine further includes a generator driven by the engine; and
   the system further includes:
      an input device manually movable to generate a second signal indicative of at least one of a desired engine speed and a desired generator load; and
      the controller is further configured to selectively adjust the current waveform based on the second signal.

5. The system of claim 4, wherein the sensor is one of an engine speed sensor and a generator load sensor.

6. The system of claim 4, wherein:
   the controller is further configured to calculate the fuel consumption value for each of the plurality of different settings within each of the plurality of different modes.

7. The system of claim 6, wherein the controller is further configured to sum the modified fuel consumption values for each of the plurality of different modes.

8. The system of claim 7, wherein the controller is further configured to:
   determine an amount of brake horsepower generated during operation within each of the plurality of different settings; and
   modify the brake horsepower amounts for the plurality of different settings as a function of the duty cycle.

9. The system of claim 8, wherein the controller is further configured to sum the modified brake horsepower amounts for each of the plurality of different modes.

10. The system of claim 9, wherein the controller is further configured to normalize the sums of the modified fuel consumption values for each of the plurality of different modes based on the sums of the modified brake horsepower amounts.

11. The system of claim 1, further including a display, wherein the controller is further configured to cause a representation of the fuel consumption value to be shown on the display.

12. The system of claim 1, further including a communication device, wherein the controller is further configured to cause the fuel consumption value to be transmitted to another entity via the communication device.

13. The system of claim 1, wherein the at least one injector is a liquid fuel injector.

14. The system of claim 13, wherein the at least one injector further include a gaseous fuel injector.

15. A system for a machine having an engine with at least one cylinder, and a generator driven by the engine, the system comprising:
- an injector configured to inject fuel into the at least one cylinder;
- a sensor configured to generate a first signal indicative of a performance of the machine;
- an input device manually movable to generate a second signal indicative of at least one of a desired engine speed and a desired generator load, wherein the input device is movable to indicate selection of one of a plurality of different settings, the machine is operable in a plurality of different modes; and
- a controller in communication with the injector, the sensor, and the input device, the controller being configured to:
  - generate a current waveform for the injector based on the second signal;
  - selectively adjust the current waveform based on the first signal;
  - determine an injector duration based on a pulse width of the current waveform;
  - calculate a fuel consumption value for the machine based on the injection duration;
  - determine a duty cycle for each of the plurality of different modes;
  - calculate the fuel consumption value for each of the plurality of different settings within each of the plurality of different modes; and
  - modify the fuel consumption values for the plurality of different settings as a function of the duty cycle.

16. The system of claim 15, wherein:
the controller is further configured to:
- sum the modified fuel consumption values for each of the plurality of different modes;
- determine an amount of brake horsepower generated during operation within each of the plurality of different settings;
- modify the brake horsepower amounts for the plurality of different settings as a function of the duty cycle;
- sum the modified brake horsepower amounts for each of the plurality of different modes; and
- normalize the sums of the modified fuel consumption values for each of the plurality of different modes based on the sums of the modified brake horsepower amounts.

17. A method of monitoring fuel consumption for a machine operable in a plurality of different modes having an engine with at least one cylinder, and a generator driven by the engine, the method comprising:
- injecting fuel into the at least one cylinder;
- generating a first signal indicative of a performance of the machine;
- receiving input indicative of at least one of a plurality of different settings, each corresponding to a different desired engine speed and a different desired generator load;
- generating an injector current waveform based on the input;
- selectively adjusting the injector current waveform based on the first signal;
- determining an injector duration based on a pulse width of the injector current waveform;
- calculating a fuel consumption value for the machine based on the injection duration;
- determining a duty cycle for each of the plurality of different modes;
- calculating the fuel consumption value for each of the plurality of different settings within each of the plurality of different modes;
- modifying the fuel consumption values for the plurality of different settings as a function of the duty cycle.

18. The method of claim 17, wherein:
the method further includes:
- summing the modified fuel consumption values for each of the plurality of different modes;
- determining an amount of brake horsepower generated during operation within each of the plurality of different settings;
- modifying the brake horsepower amounts for the plurality of different settings as a function of the duty cycle;
- summing the modified brake horsepower amounts for each of the plurality of different modes; and
- normalizing the sums of the modified fuel consumption values for each of the plurality of different modes based on the sums of the modified brake horsepower amounts.

* * * * *